(12) United States Patent
Hilleren et al.

(10) Patent No.: US 11,028,963 B2
(45) Date of Patent: Jun. 8, 2021

(54) VERTICALLY ADJUSTABLE PEDESTAL FOR BOAT ACCESSORY

(71) Applicant: Brunswick Corporation, Mettawa, IL (US)

(72) Inventors: Derek E. Hilleren, Saint Paul, MN (US); Todd W. Moore, Rosemount, MN (US); Christopher P. Quiring, Cottage Grove, MN (US)

(73) Assignee: Brunswick Corporation, Mettawa, IL (US)

( * ) Notice: Subject to any disclaimer, the term of this patent is extended or adjusted under 35 U.S.C. 154(b) by 53 days.

(21) Appl. No.: 16/423,628

(22) Filed: May 28, 2019

(65) Prior Publication Data

US 2020/0375361 A1 Dec. 3, 2020

(51) Int. Cl.

| *F16M 11/28* | (2006.01) |
|---|---|
| *A47C 3/40* | (2006.01) |
| *B63B 29/04* | (2006.01) |
| *A47C 3/26* | (2006.01) |
| *A47C 7/00* | (2006.01) |
| *B63B 29/06* | (2006.01) |

(52) U.S. Cl.
CPC .............. *F16M 11/28* (2013.01); *A47C 3/26* (2013.01); *A47C 3/40* (2013.01); *A47C 7/004* (2013.01); *B63B 29/06* (2013.01); *B63B 2029/043* (2013.01)

(58) Field of Classification Search
CPC ....... F16M 11/28; F16B 7/1472; B63B 29/04; B63B 29/06; B63B 2029/043; B63B 2029/046; A43C 3/28; A43C 3/30; A43C 3/40; A47B 2009/086; A47B 9/083; F16C 29/0692
See application file for complete search history.

(56) References Cited

U.S. PATENT DOCUMENTS

| 3,353,875 A | * | 11/1967 | Karge ................. F16C 29/0697 384/45 |
| 4,357,785 A | * | 11/1982 | Eklund ................. E04H 12/182 52/632 |
| 5,385,323 A | | 1/1995 | Garelick |
| 5,431,362 A | | 7/1995 | Carnahan et al. |

(Continued)

OTHER PUBLICATIONS

Property Information, Young's Modulus and Specific Stiffness, Mar. 19, 2018, https://web.archive.org/web/20180319212508/http://www-materials.eng.cam.ac.uk/mpsite/properties/non-IE/stiffness.html. (Year: 2018).*

*Primary Examiner* — Jonathan Liu
*Assistant Examiner* — Guang H Guan
(74) *Attorney, Agent, or Firm* — Andrus Intellectual Property Law, LLP (57) ABSTRACT

A vertically adjustable pedestal for a boat accessory includes a hollow outer column and an inner column positioned within the outer column. The inner and outer columns are longitudinally slidable with respect to one another. A plate is captured between the inner and outer columns. The plate is laterally adjustable to create a frictional force between the inner and outer columns that prevents lateral movement therebetween. One of the inner and outer columns is configured to be connected to a supporting surface of a boat. The other of the inner and outer columns is configured to be connected to the boat accessory.

9 Claims, 4 Drawing Sheets

(56) References Cited

U.S. PATENT DOCUMENTS

| | | | |
|---|---|---|---|
| 5,882,076 A | 3/1999 | Garelick et al. | |
| 6,189,843 B1 * | 2/2001 | Pfister | A47B 9/083 |
| | | | 248/157 |
| 6,368,225 B1 * | 4/2002 | Breese | F16C 3/02 |
| | | | 285/382.2 |
| 6,378,816 B1 * | 4/2002 | Pfister | A47B 9/083 |
| | | | 248/157 |
| 6,663,057 B2 | 12/2003 | Garelick et al. | |
| 6,877,811 B1 | 4/2005 | Garelick | |
| 8,430,218 B2 | 4/2013 | Klinke | |
| 9,247,806 B2 | 2/2016 | Lorenzen et al. | |
| 9,366,379 B2 * | 6/2016 | Bowman | F16M 11/045 |
| 9,376,159 B2 * | 6/2016 | Kuo | B62K 19/36 |
| 9,435,364 B2 * | 9/2016 | Wang | A47C 19/024 |
| 9,599,153 B2 * | 3/2017 | Aldrich | F16C 43/02 |
| 9,743,755 B2 * | 8/2017 | Lin | B66F 3/26 |
| 10,004,326 B2 | 6/2018 | Randlov et al. | |
| 10,041,624 B2 * | 8/2018 | Christen | A47C 3/40 |
| 10,107,448 B1 * | 10/2018 | Hung | A47B 9/20 |
| 10,342,327 B2 * | 7/2019 | Lin | A47B 9/20 |
| 10,393,163 B2 * | 8/2019 | Ucgun | F16B 7/1472 |
| 10,512,334 B1 * | 12/2019 | Koh | A47C 3/30 |
| 2020/0375361 A1 * | 12/2020 | Hilleren | A47C 7/004 |

* cited by examiner

VERTICALLY ADJUSTABLE PEDESTAL FOR BOAT ACCESSORY

FIELD

The present disclosure relates to vertically adjustable pedestals for boat accessories, such as, but not limited to, tables or seats.

BACKGROUND

U.S. Pat. No. 5,385,323 discloses a pair of rigid hollow tubular members that are telescoped together with one of the members having a series of spaced-apart grooves running parallel to the axis and the other having a series of spaced-apart ribs running parallel to its axis with the ribs slidably engaged in the grooves and means for releasably applying radial force between the two tubular members to force the ribs and the grooves into tight engagement to frictionally lock the tubular members together in a very stable fashion so they support a load without wobbling yet can be released when necessary.

U.S. Pat. No. 6,663,057 discloses a vertically adjustable pedestal for a boat accessory such as a table or seat, which is made up of a pair of telescoped tubular members having opposite facing lengthwise recesses which contain rods to allow one member to adjustably slide with respect to the other yet preventing rotation. A releasable locking device holds the adjusted member at its desired elevation.

The above-noted patents are hereby incorporated herein by reference in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a vertically adjustable pedestal for a boat accessory includes a hollow outer column and an inner column positioned within the outer column. The inner and outer columns are longitudinally slidable with respect to one another. A plate is captured between the inner and outer columns. The plate is adjustable to create a frictional force between the inner and outer columns that prevents lateral movement therebetween. One of the inner or outer columns is configured to be connected to a supporting surface of a boat. The other of the inner or outer columns is configured to be connected to the boat accessory.

According to another example of the present disclosure, a vertically adjustable pedestal for a boat accessory includes a hollow outer column comprising at least three longitudinally extending inner surfaces. An inner column is positioned within the outer column and includes at least three longitudinally extending outer surfaces respectively facing the inner surfaces. A plate is positioned between one of the inner surfaces and a respective one of the outer surfaces. The plate is laterally movable to wedge the remaining outer surfaces against the respective inner surfaces. The inner and outer columns are longitudinally slidable with respect to one another. One of the inner or outer columns is configured to be connected to a supporting surface of a boat. The other of the inner or outer columns is configured to be connected to the boat accessory.

BRIEF DESCRIPTION OF DRAWINGS

Examples of pedestals for boat accessories are described with reference to the following Figures. The same numbers are used throughout the Figures to reference like features and like components.

DETAILED DESCRIPTION

Figure 1:
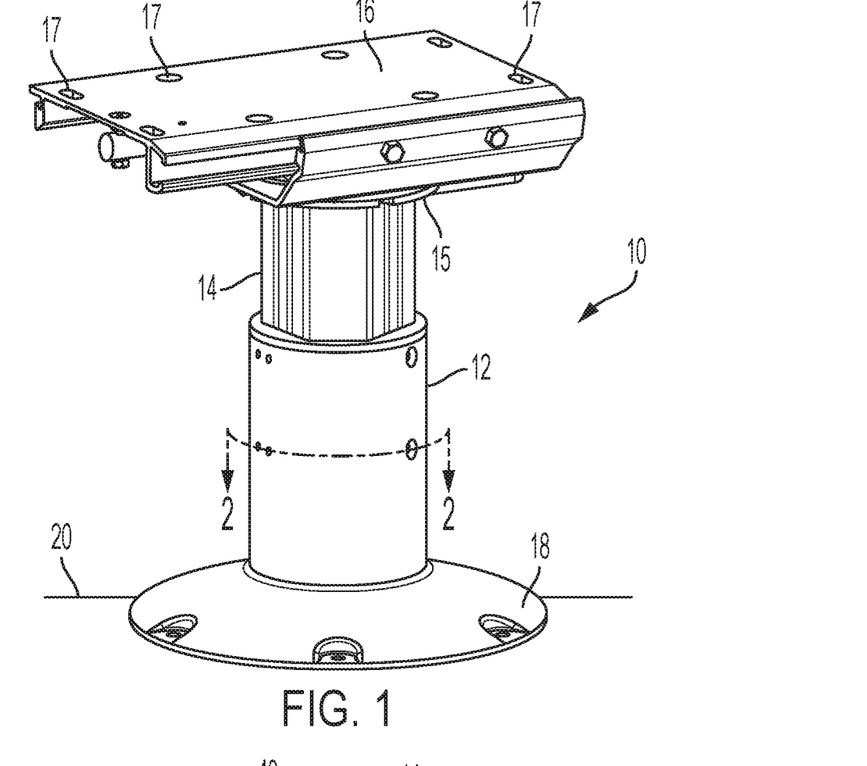
FIG. 1 illustrates a first embodiment of a pedestal for a boat accessory.

FIG. 1 illustrates a vertically adjustable pedestal 10 for a boat accessory, such as, but not limited to, a seat, table, barbecue grill, or other known boat accessory. The pedestal 10 includes a hollow outer column 12 and an inner column 14 positioned within the outer column 12. One of the inner or outer columns 14, 12 is configured to be connected to a supporting surface 20 of the boat, such as the boat deck, and the other of the inner or outer columns 14, 12 is configured to be connected to the boat accessory, such as through a support platform 16. Here, the accessory support platform 16 is coupled to a top end of the inner column 14 and includes apertures 17 for insertion of bolts that connect the support platform 16 to the boat accessory (not shown) in a known manner. A mounting plate 18 is provided around the outer column 12. The mounting plate 18 can be used to mount the pedestal 10 to the supporting surface 20 of the boat and/or to provide an aesthetically pleasing look to the pedestal 10. Although here the inner column 14 is shown as being connected to the support platform 16, and the outer column 12 is shown as being connected to the supporting surface 20 of the boat, it should be understood that these connections may be reversed in alternative embodiments. In either embodiment, however, the inner and outer columns 14, 12 are longitudinally slidable with respect to one another, so as to adjust a height of the support platform 16 with respect to the supporting surface 20 of the boat.

Figure 2:
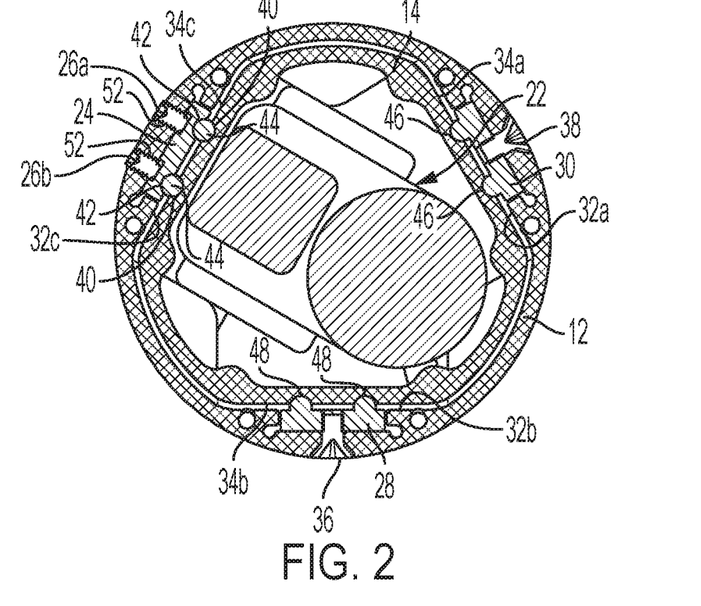
FIG. 2 illustrates a cross section of the pedestal, taken alone the line 2-2 in FIG. 1.

FIG. 2 shows a cross sectional view through the inner and outer columns 14, 12 of the pedestal 10, taken along the line 2-2 in FIG. 1. A lifting actuator 22 is shown within the hollow of the inner column 14. The lifting actuator 22 may be supported on the supporting surface 20 of the boat or may be located underneath the supporting surface 20. The lifting actuator 22 has a movable end that is coupled to the inner column 14 for raising and lowering the inner column 14 with respect to the outer column 12. The lifting actuator 22 could be a gas spring, an electric linear actuator, a hydraulic piston-cylinder, or any other actuator known to those having ordinary skill in the art, and can be actuated by a push button. The manner in which the movable end of the lifting actuator 22 is coupled to the inner column 14 can be accomplished in any way known to those having ordinary skill in the art, such as by being bolted, screwed, or otherwise fastened to a top plate 15 (FIG. 1) connected to the inner column 14 or to a block connected to the support platform 16. Extension of the movable end of the lifting actuator 22 away from the supporting surface 20 of the boat raises the inner column 14 within the outer column 12, while retraction of the movable end of the lifting actuator 22 toward the supporting surface 20 of the boat lowers the inner column 14 within the outer column 12.

According to the present disclosure, the inner column 14 has at least one longitudinally extending planar outer surface facing a corresponding longitudinally extending planar inner surface of the outer column 12. Here, the hollow outer column 12 comprises at least three longitudinally extending planar inner surfaces 32a, 32b, 32c, and the inner column 14 comprises at least three longitudinally extending planar outer surfaces 34a, 34b, 34c respectively facing the inner surfaces 32a, 32b, 32c. These surfaces 32a, 32b, 32c and 34a, 34b, 34c roughly take the shape of triangles when viewed in cross-section, although the corners of the "triangles" are radiused/rounded to match the cylindrical outer surface of the outer column 12. In other embodiments, the inner and outer columns 14, 12 could have other cross-sectional shapes, such as shapes with four or more sides or a circular shape.

Figure 3:
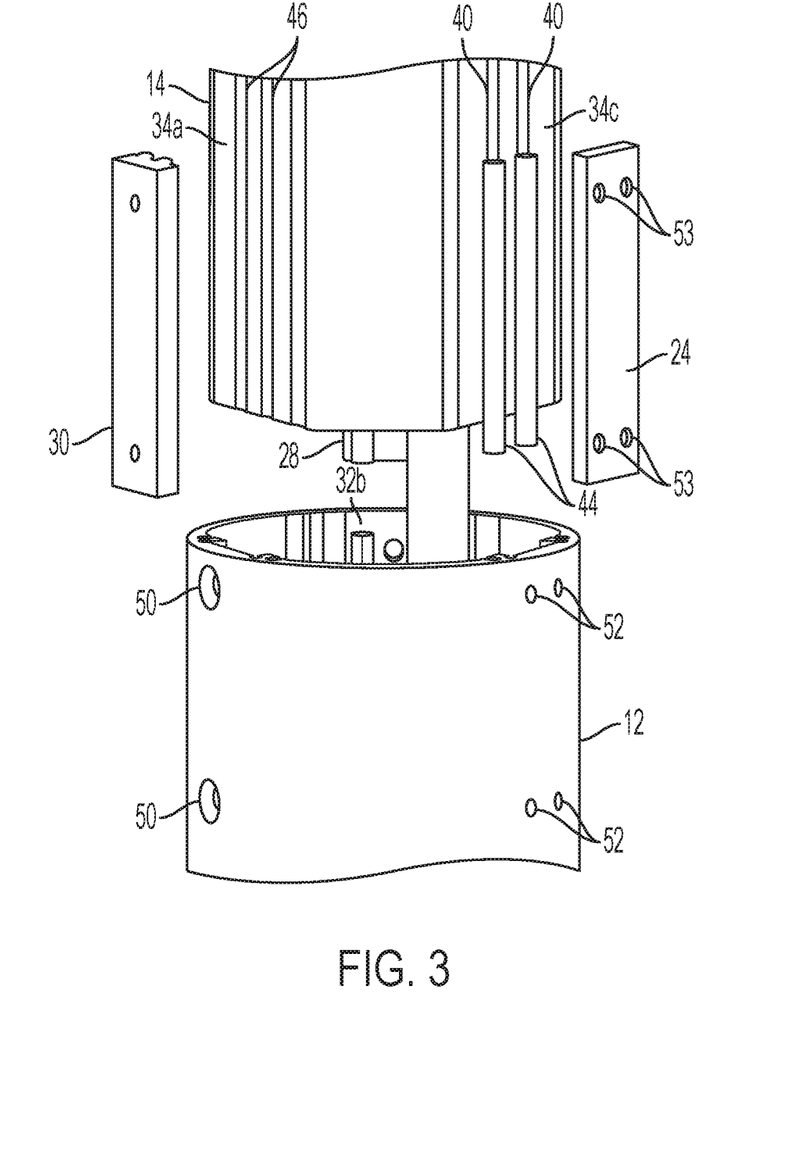
FIG. 3 illustrates an exploded view of a portion of the pedestal of FIG. 1.

Referring to FIGS. 2 and 3, a plate 24 is captured between the inner and outer columns 14, 12. The plate 24 is adjustable to create (e.g., increase) a frictional force between the inner and outer columns 14, 12. The frictional force, once it reaches a threshold, prevents lateral movement of the inner and outer columns 14, 12 with respect to one another, which would otherwise make the pedestal 10 feel wobbly. In the present example, the plate 24 is laterally adjustable to create the frictional force. To provide for such lateral adjustment, fasteners 26a, 26b, such as set screws, extend through threaded holes 52 in the outer column 12 and contact the plate 24 at indentations 53. Rotation of the fasteners 26a, 26b within threaded holes 52 moves the plate 24 laterally to adjust the frictional force between the inner and outer columns 14, 12. Specifically, rotation of the fasteners 26a, 26b in a direction tending to tighten the fasteners 26a, 26b within threaded holes 52 (i.e., move the fasteners 26a, 26b radially inwardly toward the inner column 14) moves the plate 24 radially inwardly toward the inner column 14 and increases the frictional force between the inner and outer columns 14, 12. Conversely, rotation of the fasteners 26a, 26b in a direction tending to loosen the fasteners 26a, 26b within threaded holes 52 lessens force on the plate 24, which allows the plate 24 to move radially outwardly with respect to the inner column 14, thereby decreasing the frictional force between the inner and outer columns 14, 12.

As shown in FIG. 2, the plate 24 is positioned between one of the inner surfaces (here, inner surface 32c) of the outer column 12 and a respective one of the outer surfaces (here, outer surface 34c) of the inner column 14. Lateral movement of the plate 24 in a radially inward direction, caused by tightening of the fasteners 26a, 26b within threaded holes 52, moves the inner column 14 laterally and wedges the remaining outer surfaces 34a, 34b of the inner column 14 against the respective remaining inner surfaces 32a, 32b of the outer column 12. Such wedging together of the planar inner surfaces 32a, 32b and planar outer surfaces 34a, 34b creates the threshold friction necessary to prevent wobble of the inner column 14 with respect to the outer column 12.

An additional plate 28 is captured between the inner and outer columns 14, 12 at a different location than that of the plate 24. Another additional plate 30 is captured between the inner and outer columns 14, 12 at a still different location. The plates 24, 28, 30 are respectively captured between the planar outer surfaces 34a, 34b, 34c of the inner column 14 and the planar inner surfaces 32a, 32b, 32c of the outer column 12. The additional plates 28, 30 are shown as not being laterally adjustable with respect to the inner and outer columns 14, 12. More specifically, the additional plate 28 is fixed to the inner surface 32b of the outer column 12 by way of a bolt 36, and the additional plate 30 is fixed to the inner surface 32a of the outer column 12 by way of a bolt 38; however, any fixed fasteners could be used. Note that although the additional plates 28, 30 are shown as being fixed with respect to the outer column 12, the additional plates 28, 30 could instead be laterally movable, such as if the arrangement of the set screw-type fasteners 26a, 26b and plate 24 were provided at these locations. However, it is acceptable for the additional plates 28, 30 to be fixed, as they serve as a surface against which the outer surfaces 34a, 34b of the inner column 14 can wedge. Additionally, according to the present disclosure, the additional plates 28, 30 are made of a material with a lower coefficient of friction than a material of which the inner and outer columns 14, 12 are made. This way, the inner column 14 can slide easily with respect to the outer column 12 under the power of the lifting actuator 22.

Figure 6:
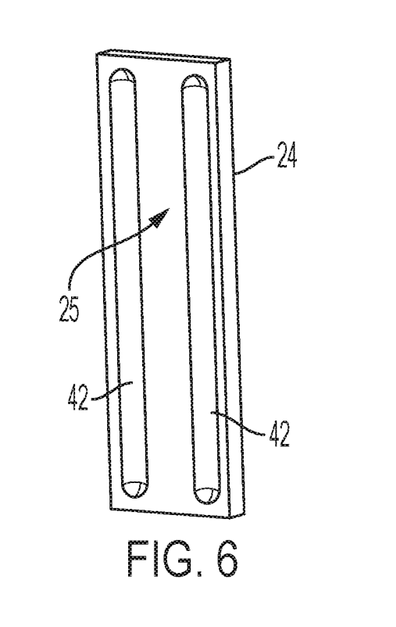
FIG. 6 illustrates another plate for use with the pedestal of FIG. 1.

According to the present disclosure, at least one of the plates 24, 28, 30 is attached to one of the inner and outer surfaces 32a, 32b, 32c and 34a, 34b, 34c of the respective outer and inner columns 12, 14 (here, to the inner surfaces 32a, 32b, 32c of the outer column 12) and has a surface irregularity facing the other of the inner and outer surfaces 32a, 32b, 32c and 34a, 34b, 34c. The other of the inner and outer surfaces 32a, 32b, 32c and 34a, 34b, 34c of the respective outer and inner columns 12, 14 has a corresponding surface irregularity. The surface irregularities are configured to limit lateral and rotational movement of the inner and outer columns 14, 12, with respect to one another. In one example, the surface irregularities comprise longitudinally extending grooves. More specifically, referring now also to FIGS. 3 and 6, a surface of at least one of the plate 24 and the additional plates 28, 30 has a first longitudinally aligned groove therein, and a facing surface of at least one of the inner and outer columns 14, 12 has a second longitudinally aligned groove therein, the first and second grooves facing one another. Here, two grooves 42 are formed in a surface 25 of the plate 24 that faces the inner column 14. Corresponding grooves 40 are formed on the outer surface 34c of the inner column 14. A longitudinally aligned rod is captured within the first and second longitudinally aligned grooves. More specifically, here, two rods 44 are captured within the longitudinally aligned grooves 40, 42, between the surface 25 of the plate 24 and the outer surface 34c of the inner column 14. The rods 44 are made of a material with a lower coefficient of friction than the material of which the inner and outer columns 14, 12 are made to facilitate sliding of the inner column 14 with respect to the outer column 12 under the power of the lifting actuator 22.

Figure 5:
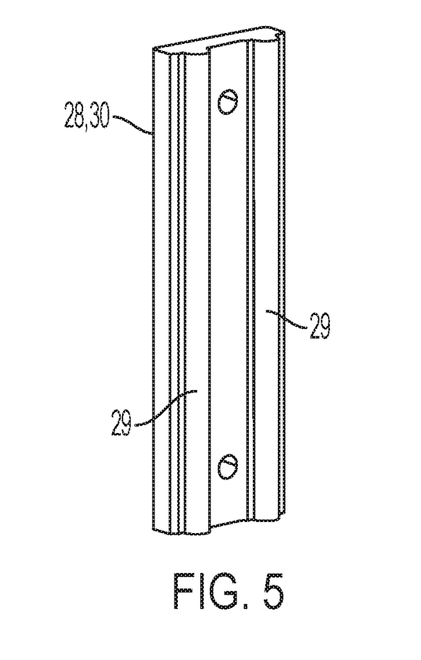
FIG. 5 illustrates a plate for use with the pedestal of FIG. 1.

In the above-described example, the surface irregularities on the plate 24 are the grooves 42, and the surface irregularities on the outer surface 34c of the inner column 14 are the grooves 40. The rods 44 captured within these grooves 40, 42 limit lateral and rotational movement of the inner and outer columns 14, 12 with respect to one another by providing a shear force in response to any lateral or rotational force applied to the pedestal 10. In another example, the surface irregularities can be built into the plate(s) 24, 28, 30 themselves. For example, the outer surfaces 34a, 34b of the inner column 14 each have grooves 46, 48, but the surface irregularities on the plates 28, 30 comprise longitudinally extending protrusions 29 (FIG. 5) that are integral with the plates 28, 30 themselves. However, it should be understood that the additional plates 28, 30 could instead also have grooves provided therein, and separate rods (similar to rods 44) could be provided for situating between the grooves in the plates 28, 30 and the grooves 46, 48 in the outer surfaces 34a, 34b of the inner column 14. Thus, the rods 44 may be integral with or separate components from the at least one of the plate 24 and the additional plates 28, 30. In one example, the rods 44 are integrally attached to the plate 24, such as by way of overmolding. Those having ordinary skill in the art would understand that the rods 44 need not have the cylindrical shape shown herein, but could have another cross-sectional shape, such as ovular, rectangular, or square.

Figure 4:
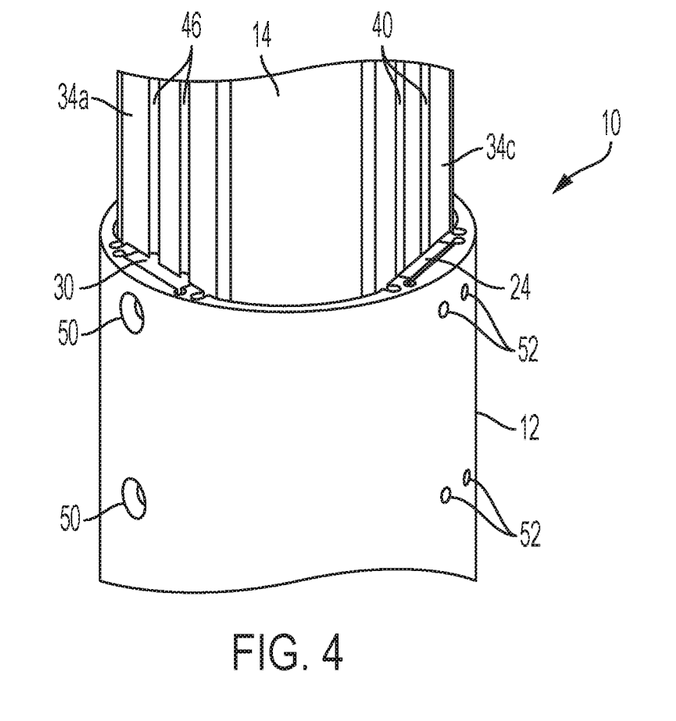
FIG. 4 illustrates a view of the same portion of the pedestal when it is assembled.

Now turning to FIG. 4, an assembled close-up view of the pedestal 10 will be described. To assemble the pedestal 10, the additional plates 28, 30 may be bolted to the outer column 12, such as by inserting bolts 36, 38 (FIG. 2) through bolt holes, two of which are shown at 50 in FIG. 4. The inner column 14 can be then slid downwardly into the hollow outer column 12, and the rods 44 and plate 24 inserted into the gap between the inner and outer columns 14, 12, with the rods 44 situated in the grooves 40 in the outer surface 34c of the inner column 14. Four fasteners (such as 26a, 26b, FIG. 2) can then be inserted into the threaded holes 52 and tightened to push against the plate 24 and move the plate 24 laterally towards the inner column 14. To provide the above-noted wedging action, the laterally movable plate 24 may be made of a material that is stiffer than a material of which the additional plates 28, 30 are made. For instance, the laterally movable plate 24 may be made of stainless steel or another rigid material that will not bend or otherwise deform at the locations where fasteners 26a, 26b are tightened against it, such that the entire plate 24 can provide a pushing force against the inner column 14. The additional plates 28, 30 can be made of a material having a lower coefficient of friction than the laterally movable plate 24 (and, as noted above, than that of the inner and outer columns 14, 12), such as acetal (Polyoxymethylene/POM). One such acetal is a homopolymer resin sold under the tradename DELRIN™ by Dupont. The rods 44 may also be made of acetal homopolymer resin, in order to facilitate sliding of the inner column 14 with respect to the outer column 12 under the power of the lifting actuator 22.

In this example, the fasteners 26a, 26b extend through the outer column 12, and heads of the fasteners 26a, 26b are accessible from outside the pedestal 10 so as to allow a user to adjust the tightness of the plate 24 against the inner column 14. Such user adjustment might be necessary, after initial adjustment at the factory, if the inner column 14 starts to wobble with respect to the outer column 12 over time and after repeated use. However, because the inner column 14 is also hollow, note that the fasteners 26a, 26b could extend through either one of the inner or outer columns 14, 12; if the fasteners 26a, 26b extended through the outer surface 34c of the inner column 14, the plate 24 would then instead wedge against the inner surface 32c of the outer column 12 to create the frictional force. Note that in this alternative embodiment, the plates 28, 30 could be bolted to the outer faces 34a, 34b of the inner column 14. It should be understood that the grooves would then be provided in the inner surfaces 32a, 32b, 32c of the outer column 12, instead of on the outer surfaces 34a, 34b, 34c of the inner column 14.

Although the plates 24, 28, 30 are shown herein as being planar, they could instead have a cupped shape if the diameter of the inner column 14 was small enough to allow for adequate gripping thereof by the plates. In that instance, the inner column 14 would have a corresponding cylindrical outer surface for the plates 24, 28, 30 to contact.

Figure 7:
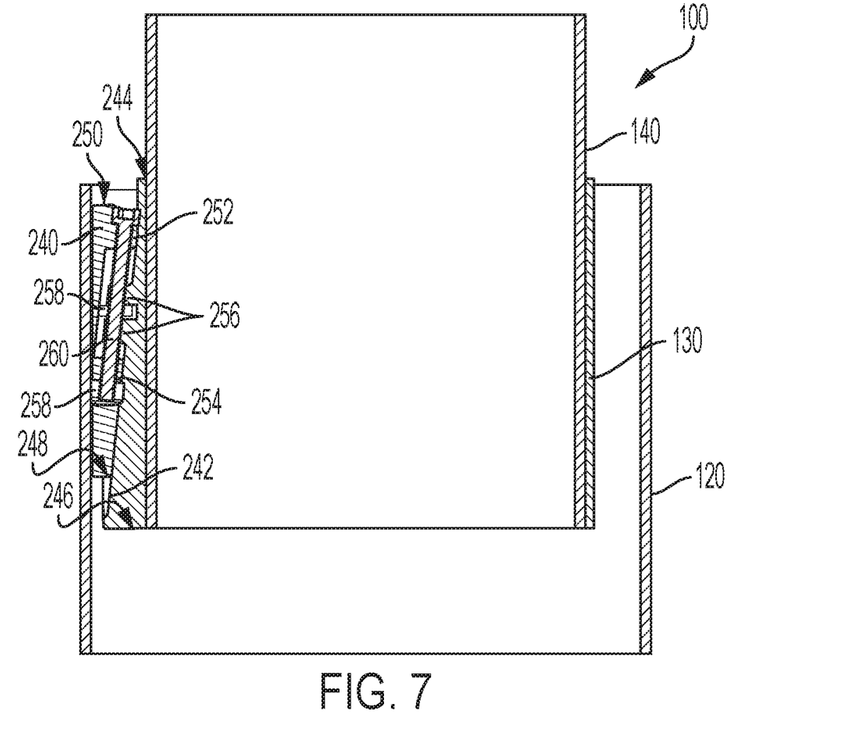
FIG. 7 illustrates a cross section of a second embodiment of a pedestal for a boat accessory.
Figure 8:
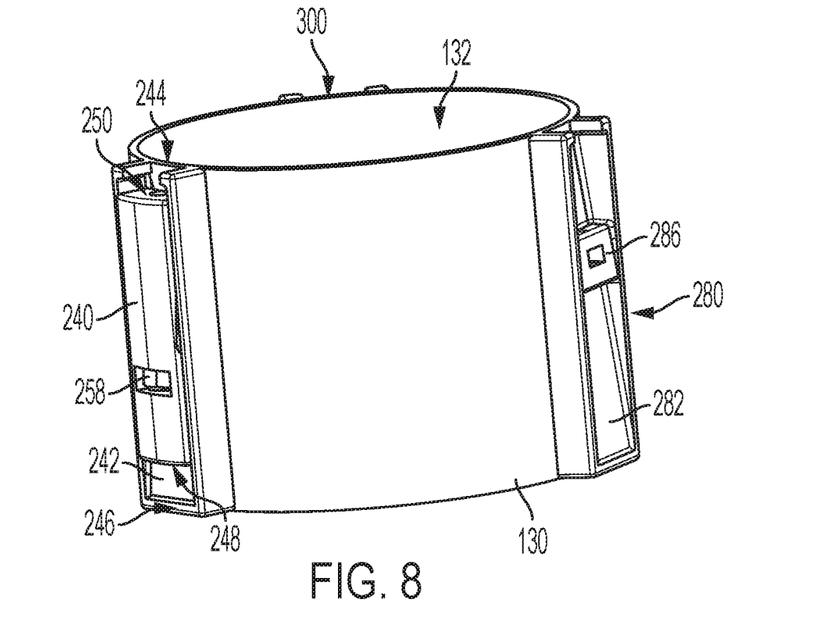
FIG. 8 illustrates a portion of the second embodiment of the pedestal.

FIG. 7 illustrates a cross section through a portion of a second embodiment of a pedestal 100 according to the present disclosure. The pedestal 100 includes a hollow outer column 120 and an inner column 140 positioned within the outer column 120, wherein the inner and outer columns 140, 120 are longitudinally slidable with respect to one another. As with the first embodiment, one of the inner or outer columns (here the outer column 120) is configured to be connected to a supporting surface of a boat, and the other of the inner or outer columns (here, the inner column 140) is configured to be connected to a boat accessory. A sleeve 130 is provided between the inner column 140 and the outer column 120. The sleeve 130 is shown in FIG. 8 without the inner or outer column, it being understood that the inner column 140 would fit inside the circumferential opening 132 in the sleeve 130. The inner diameter of the sleeve 130 and the outer diameter of the inner column 140 are closely matched such that the sleeve 130 touches the entire outer circumference of the inner column 140.

Referring to both FIGS. 7 and 8, a plate 240 is captured between the inner and outer columns 140, 120. Additional plates are captured at different locations between the inner and outer columns 140, 120. Although these additional plates are not shown, one plate would be provided at location 280, and one plate would be provided at location 300, such that three plates are spaced relatively evenly around the sleeve 130. The plates 240 and at locations 280, 300 are situated adjacent wedge-shaped protrusions 242, 282 and at location 300, respectively, on an outer circumference of the sleeve 130. The wedge of each wedge-shaped protrusion 242, 282 and at location 300 is narrower at the top end than at the bottom end, such as shown by narrower top end 244 and wider bottom end 246 of wedge-shaped protrusion 242. The plates 240 and at locations 280, 300 have corresponding wedge-shaped surfaces that are narrower at the bottom end than at the top end, such as shown by narrower bottom end 248 and wider top end 250 of plate 240. As will be described below, the plates 240 and at locations 280, 300 are adjustable to create a frictional force between the inner and outer columns 140, 120 that prevents lateral movement therebetween. As with the first embodiment, rotation of a fastener moves the plate 240 to adjust the frictional force between the inner and outer columns 140, 120.

For example, referring to FIG. 7, by tightening a fastener such as bolt 260, which is accessible at its head, the wedge-shaped plate 240 is moved downward with respect to the pedestal 100. The bolt 260 runs through the plate 240 at ledges 252, 254 and through the sleeve 130 at ledge 256 (see similar ledge 286 at location 280), and is provided with nuts 258. Tightening the bolt 260 through bolt holes in ledges 252, 254, 256 and nuts 258 wedges a progressively wider portion of the wedge-shaped plate 240 against the wedge-shaped protrusion 242 on the sleeve 130. This wedging action increases frictional force between the plate 240 and the inner surface of the outer column 120. The same wedging action occurs upon tightening bolts in plates at locations 280 and 300. The plates 240 and at locations 280, 300 could be made of a material having a lower coefficient of friction than that of the inner and outer columns 140, 120, and the sleeve 130 in order to allow for smooth movement of the inner column 140 with respect to the outer column 120 under the power of the lifting actuator 22. Note that although the plates at locations 280, 300 are not described or shown herein, they are the same as plate 240 and are situated on wedge-shaped protrusions (e.g., 282 at location 280) of the sleeve 130 that are similar to wedge-shaped protrusion 242.

It should be understood that the inner and outer columns 140, 120 need not have cylindrical facing outer and inner surfaces, respectively. Rather, the columns 140, 120 could have any corresponding geometry, such as the geometry of the inner and outer columns 14, 12 of the first embodiment of the pedestal 10. In this instance, the sleeve 130 would also have the somewhat triangular shape of the outer surface of the inner column 140 and the inner surface of the outer column 120. The wedge-shaped protrusions 242, 282, and at location 300 would be located on the three planar surfaces of the sleeve 130.

In the present description, certain terms have been used for brevity, clarity, and understanding. No unnecessary limitations are to be implied therefrom beyond the requirement of the prior art because such terms are used for descriptive purposes only and are intended to be broadly construed. The different systems described herein may be used alone or in combination with other systems. Various equivalents, alternatives, and modifications are possible within the scope of the appended claims. Each limitation in the appended claims is intended to invoke interpretation under 35 USC § 112(f), only if the terms "means for" or "step for" are explicitly recited in the respective limitation.

What is claimed is:

1. A vertically adjustable pedestal for a boat accessory, the pedestal comprising:
    a hollow outer column;
    an inner column positioned within the outer column, wherein the inner and outer columns are slidable with respect to one another in a longitudinal direction of the pedestal;
    a first plate captured between the inner and outer columns at a first location, wherein the first plate is laterally adjustable with respect to the inner and outer columns to create a frictional force between the inner and outer columns that prevents lateral movement therebetween, wherein a surface of the first plate has a first groove therein extending in the longitudinal direction, and wherein a surface of one of the inner and outer columns that faces the surface of the first plate has a second groove therein extending in the longitudinal direction, the first and second grooves facing one another;
    a first rod extending in the longitudinal direction and captured within the first and second grooves, wherein the first rod is made of a material with a lower coefficient of friction than a material of which the inner and outer columns are made; and
    a second plate captured between the inner and outer columns at a second location that is different from the first location, wherein the second plate is made of a material with a lower coefficient of friction than the material of which the inner and outer columns are made and has at least one integral protrusion formed on a surface thereof, the at least one integral protrusion extending in the longitudinal direction, and wherein a surface of one of the inner and outer columns that faces the surface of the second plate has at least a third groove therein extending in the longitudinal direction that faces and receives the at least one integral protrusion;
    wherein the surface of the first plate has a fourth groove therein extending in the longitudinal direction, wherein the surface of the one of the inner and outer columns that faces the surface of the first plate has a fifth groove therein extending in the longitudinal direction, the fourth and fifth grooves facing one another, and wherein the pedestal comprises a second rod extending in the longitudinal direction and captured within the fourth and fifth grooves, the second rod being made of the material of the first rod and being spaced apart from the first rod;
    wherein the pedestal comprises a fastener contacting the first plate, the fastener being configured such that rotation thereof moves the first plate laterally to cause the inner column to wedge against the second plate and thereby adjust the frictional force between the inner and outer columns;
    wherein the first plate is made of a material that is stiffer than the material of which the second plate is made; and
    wherein one of the inner and outer columns is configured to be connected to a supporting surface of a boat, and the other of the inner and outer columns is configured to be connected to the boat accessory.

2. The pedestal of claim 1, wherein the inner column has first and second planar outer surfaces extending in the longitudinal direction and facing respective first and second planar inner surfaces of the outer column that extend in the longitudinal direction.

3. The pedestal of claim 2, wherein the first plate is captured between the first planar outer surface and the first planar inner surface, and the second plate is captured between the second planar outer surface and the second planar inner surface.

4. The pedestal of claim 1, wherein the inner column has first, second, and third planar outer surfaces extending in the longitudinal direction and facing respective first, second, and third planar inner surfaces of the outer column that extend in the longitudinal direction;
    wherein the first plate is captured between the first planar outer surface and the first planar inner surface and the second plate is captured between the second planar outer surface and the second planar inner surface; and
    further comprising a third plate captured between the third planar outer surface and the third planar inner surface, wherein the third plate is made of a material with a lower coefficient of friction than the material of which the inner and outer columns are made.

5. The pedestal of claim 1, further comprising a lifting actuator coupled to the inner column for raising and lowering the inner column with respect to the outer column.

6. The pedestal of claim 1, wherein the at least one integral protrusion on the second plate comprises first and second integral protrusions, which are spaced apart and extend in the longitudinal direction;
    wherein the third groove receives the first integral protrusion; and
    wherein the surface of the one of the inner and outer columns that faces the surface of the second plate has a sixth groove therein extending in the longitudinal direction that faces and receives the second integral protrusion.

7. A vertically adjustable pedestal for a boat accessory, the pedestal comprising:
    a hollow outer column comprising at least first, second, and third inner surfaces extending in a longitudinal direction of the pedestal;
    an inner column positioned within the outer column and comprising at least first, second, and third outer surfaces extending in the longitudinal direction and respectively facing the first, second, and third inner surfaces; and a first plate positioned between the first inner surface and the first outer surface, a second plate positioned between the second inner surface and the second outer surface, and a third plate positioned between the third inner surface and the third outer surface, wherein the first plate is laterally movable to wedge the second and third outer surfaces of the inner column against the respective second and third plates on the respective second and third inner surfaces of the outer column;

a fastener extending through one of the inner and outer columns and contacting the first plate, wherein the fastener is configured such that rotation thereof moves the first plate laterally; and a first rod extending in the longitudinal direction and captured between the first plate and the first outer surface within a first groove in the first plate and a second groove in the first outer surface, wherein the first rod is made of a material with a lower coefficient of friction than a material of which the inner and outer columns are made;

wherein the second plate is attached to one of the second inner surface and the second outer surface and has first and second parallel, spaced-apart protrusions formed on a face of the second plate that is not attached to the one of the second inner surface and the second outer surface, the first and second protrusions extending in the longitudinal direction;

wherein the other of the second inner surface and the second outer surface that faces the one of the second inner surface and the second outer surface to which the second plate is attached has third and fourth parallel, spaced-apart grooves respectively facing the first and second protrusions on the face of the second plate;

wherein the first and second protrusions are respectively received within the third and fourth grooves and thereby configured to limit lateral and rotational movement of the inner and outer columns with respect to one another;

wherein the pedestal comprises a second rod extending in the longitudinal direction and captured between the first plate and the first outer surface within a fifth groove in the first plate and a sixth groove in the first outer surface, wherein the second rod is made of the material of the first rod, and wherein the first and second rods are spaced apart from one another;

wherein the second and third plates are made of a material with a lower coefficient of friction than the material of which the inner and outer columns are made;

wherein the first plate is made of a material that is stiffer than the material of which the second and third plates are made;

wherein the inner and outer columns are slidable with respect to one another in the longitudinal direction; and wherein one of the inner and outer columns is configured to be connected to a supporting surface of a boat, and the other of the inner and outer columns is configured to be connected to the boat accessory.

8. The pedestal of claim 7, wherein the second and third plates are not laterally movable.

9. The pedestal of claim 7, wherein the fastener extends through the outer column, and a head of the fastener is accessible from outside the pedestal.

* * * * *